United States Patent [19]

Nishida et al.

[11] Patent Number: 5,082,729

[45] Date of Patent: Jan. 21, 1992

[54] MAGNETIC RECORDING MEDIUM FOR A VIDEO TAPE RECORDER AND A METHOD FOR PREPARING THE SAME

[75] Inventors: Tetsuji Nishida; Shinji Saito; Naoyoshi Chino, all of Kanagawa, Japan

[73] Assignee: Fuji Photo Film Co., Ltd., Kanagawa, Japan

[21] Appl. No.: 259,668

[22] Filed: Oct. 19, 1988

[30] Foreign Application Priority Data

Oct. 19, 1987 [JP] Japan .................. 62-264728

[51] Int. Cl.$^5$ .............................................. G11B 23/00
[52] U.S. Cl. .................................... 428/329; 428/336; 428/694; 428/900; 427/131
[58] Field of Search ............... 428/694, 900, 336, 329; 427/131

[56] References Cited

U.S. PATENT DOCUMENTS

| | | | |
|---|---|---|---|
| 3,473,960 | 10/1969 | Jacobson et al. | 117/237 |
| 4,624,883 | 11/1986 | Yamaguchi et al. | 428/694 |
| 4,643,941 | 2/1987 | Miyoshi et al. | 428/900 |
| 4,689,263 | 8/1987 | Kambe et al. | 428/694 |
| 4,784,495 | 11/1988 | Mizuno et al. | 428/694 |
| 4,865,924 | 9/1989 | Saito et al. | 428/900 |

FOREIGN PATENT DOCUMENTS

| | | |
|---|---|---|
| 14-28368 | 12/1939 | Japan . |
| 15-23625 | 10/1940 | Japan . |
| 16-13181 | 7/1941 | Japan . |
| 56-26890 | 6/1981 | Japan . |
| 58-17539 | 1/1983 | Japan . |
| 58-56229 | 4/1983 | Japan . |

Primary Examiner—Paul J. Thibodeau
Attorney, Agent, or Firm—Sughrue, Mion, Zinn, Macpeak & Seas

[57] ABSTRACT

A magnetic recording medium for a video tape recorder is disclosed, comprising a nonmagnetic support having thereon in the following order an under magnetic layer containing ferromagnetic particles of metal oxide and an upper magnetic layer containing ferromagnetic particles of metal oxide, wherein said under magnetic layer contains the ferromagnetic particles having a specific surface area by a BET method of from 26 to 50 m$^2$/g and a coercive force (Hc$_1$) of from 500 to 1,000 Oe; said upper magnetic layer contains the ferromagnetic particles having a specific surface area by a BET method of from 30 to 60 m$^2$/g and a coercive force (Hc$_2$) of from 600 to 1,200 Oe; the dry thickness of the upper magnetic layer is from 0.1 to 1.0 μm; and the coercive force (Hc$_2$) of the ferromagnetic particles for the upper magnetic layer is higher than the coercive force (Hc$_1$) of the ferromagnetic particles for the under magnetic layer.

14 Claims, No Drawings

MAGNETIC RECORDING MEDIUM FOR A VIDEO TAPE RECORDER AND A METHOD FOR PREPARING THE SAME

FIELD OF THE INVENTION

The present invention relates to a magnetic recording medium comprising a nonmagnetic support and a magnetic layer and, more particularly, it relates to a magnetic recording medium for a video tape recorder having at least two magnetic layers and a method for preparing the same.

BACKGROUND OF THE INVENTION

A magnetic recording medium is widely used as a tape for recording as a video tape or as a floppy disk. The magnetic recording medium is fundamentally composed of a nonmagnetic support having laminated thereon a magnetic layer containing ferromagnetic particles dispersed in a binder.

It is necessary that a magnetic recording medium has high levels of various characteristics such as electromagnetic characteristics, running durability or running performances. That is, higher performance for reproducing original sounds is required for an audio tape of recording and reproducing music. Excellent electromagnetic characteristics such as excellent performances for reproducing original images are required for a video tape.

It has been determined that frequency characteristics over the low sound range to high sound range of audio signals (D.C. 20 KHz or less) are improved by constructing plural (upper and under layers) magnetic layers in an audio tape to secure excellent electromagnetic characteristics. Such methods are disclosed in JP-A-58-17539, JP-A-58-56228 and JP-A-58-56229 (the term "JP-A" as used herein refers to a "published unexamined Japanese patent application").

In accordance with the above method, a magnetic recording medium wherein bias noise is decreased by distributing ferromagnetic particles having a large specific surface area on a surface of a magnetic layer and reproduced outputs are increased over all bandwidths by distributing ferromagnetic particles having a small specific surface area in the inside of the magnetic layer is disclosed in the above-cited Japanese references.

When plural layers are provided, that is, when an under magnetic layer and an upper magnetic layer are provided, first, an under magnetic layer is provided, dried and hardened, and thereafter, an upper layer is provided. The thickness of these magnetic layers, particularly that of the upper layer, which is thinner than that of the under layer, exceeds 1 μm in almost all cases, and satisfactory smooth properties have been attained by the above method. The above method is employed upon preparing a linear audio (i.e., an audio having a fixed head system due to an alternating current bias method, which is used in an audio tape recorder which is generally used) type magnetic recording medium and the frequency to be used therein is in a low frequency range and is at most 20 KHz.

When signals having a wide bandwidth of frequency like video signals from a low frequency (linear video: 20 KHz or less), color signals (600 KHz to 800 KHz) to a high frequency (black-and-white signals: 8 MHz or less) are recorded and reproduced, frequency characteristics and noises such as noise occurring due to granular particles or tape modulation noise occurring due to surface roughness, etc., of a tape become significant problems.

Such problems regarding video tapes cannot be resolved satisfactorily by using the above method which is applied for a linear audio type magnetic recording medium.

SUMMARY OF THE INVENTION

An object of the present invention is to provide a magnetic recording medium for a video tape recorder having excellent electromagnetic characteristics, particularly improved C/N in a wide bandwidth, and a method for preparing the same.

Thus, the present invention provides a magnetic recording medium for a video tape recorder comprising a nonmagnetic support having thereon in the following order an under magnetic layer containing ferromagnetic particles of metal oxide and an upper magnetic layer containing ferromagnetic particles of metal oxide, wherein the under magnetic layer contains ferromagnetic particles having a specific surface area by a BET method of from 26 to 50 m$^2$/g and a coercive force (Hc$_1$) of from 500 to 1,000 Oe; the upper magnetic layer contains the ferromagnetic particles having a specific surface area by a BET method of from 30 to 60 m$^2$/g and a coercive force (Hc$_2$) of from 600 to 1,200 Oe; the dry thickness of the upper magnetic layer is from 0.1 to 1.0 μm; and the coercive force (Hc$_2$) of the ferromagnetic particles for the upper magnetic layer is higher than the coercive force (Hc$_1$) of the under magnetic layer.

The magnetic recording medium of the present invention can be effectively prepared by the method for preparing a magnetic recording medium for a video tape recorder which comprises coating on a surface of a running nonmagnetic support an under coating composition for an under magnetic layer, where said under coating composition contains ferromagnetic particles of metal oxide having a specific surface area of from 26 to 50 m$^2$/g and a coercive force (Hc$_1$) of from 500 to 1,000 Oe; and while the under coated layer is wet, coating successively thereon an upper coating composition for an upper magnetic layer, where said upper coating composition contains ferromagnetic particles of metal oxide having a specific surface area by a BET method of from 30 to 60 m$^2$/g and a coercive force (Hc$_2$) of from 600 to 1,200 Oe, which is higher than the coercive force (Hc$_1$) of the under magnetic layer so that the dry thickness of the upper magnetic layer is from 0.1 to 1.0 μm.

DETAILED DESCRIPTION OF THE INVENTION

As described above, the magnetic recording medium of the present invention has at least two magnetic layers, each layer of which includes ferromagnetic particles of metal oxide having a predetermined specific surface area and a predetermined coercive force. The coercive force (Hc$_2$) of the upper magnetic layer is higher than that of the under magnetic layer(s), and the upper layer is a thin layer having a dry thickness of from 0.1 to 1.0 μm.

Accordingly, good characteristics at the high frequency bandwidth can be assured by making the coercive force (Hc$_2$) of the upper magnetic layer higher than that of the under magnetic layer(s) and defining the coercive forces of at least two layers as described above. Good characteristics at the low frequency bandwidth can be assured by making the upper magnetic layer thinner. Also, it was found that the ratio of noise occurring due to granular particles contained in the under magnetic layer to outputs increases by making the upper magnetic layer thinner, and it is necessary that ferromagnetic particles used in the under magnetic layer have a specific surface area of comparatively large value (i.e., 26 to 50 m$^2$/g) as described above, whereby noise level can be decreased.

Accordingly, the magnetic recording medium for a video tape recorder of the present invention has excellent frequency characteristics and excellent performances over noise such as noise occurring due to the granular particles or tape modulation noise occurring due to surface roughness, etc., of a tape upon recording and reproducing signals at a wide bandwidth. That is, it can be said that the magnetic recording medium of the present invention is a video tape having an improved C/N at a wide bandwidth.

Also, an extremely thin upper magnetic layer having a thickness of from 0.1 to 1.0 μm and having an extremely smooth surface can be prepared by the above method, and thus, a magnetic recording medium for a video tape recorder having an improved C/N at a wide bandwidth can be provided.

The magnetic recording medium of the present invention is fundamentally composed of a nonmagnetic support having thereon at least two magnetic layers containing ferromagnetic particles dispersed in a binder.

The nonmagnetic supports for use in the present invention include a film or a sheet composed of polyesters such as polyethylene terephthalate (PET) or polyethylene naphthalate, polyolefins such as polypropylene, cellulose derivatives such as cellulose triacetate or cellulose diacetate, vinyl type resins such as polyvinyl chloride or polyvinylidene chloride, synthetic resins such as polycarbonate, polyamide, polyamidoimide or polyimide; a foil of nonmagnetic metals such as aluminum or copper; a metal foil such as a stainless steel foil; and paper and ceramic sheets.

These supports have a thickness of generally from 2,5 to 100 μm and preferably from 3 to 80 μm.

The present inventors have studied how to improve frequency characteristics and how to reduce noise levels such as noise occurring due to a granular particle and tape modulation noise upon recording and reproducing signals at a wide bandwidth in a magnetic recording medium for a video tape recorder (a video tape). As a result of thorough studies, it was found that it is necessary that a magnetic layer structure should actually comprise plural layers comprising at least an upper and an under layer, wherein an upper magnetic layer contains ferromagnetic particles of metal oxides (e.g., γ-Fe$_2$O$_3$, Co-modified γ-Fe$_2$O$_3$) and has a coercive force (Hc$_2$) which is higher than the coercive force (Hc$_1$) of the under magnetic layer(s), and the upper magnetic layer has a low thickness of from 0.1 to 1.0 μm in order to obtain excellent frequency characteristics at a wide frequency band-width from the low frequency of long wavelengths to be recorded to the high frequency of short wavelengths to be recorded, using a ring head having a narrow gap (0.3 μm or lower) such as a home video head. More specifically, it is necessary that the under magnetic layer has ferromagnetic particles having a specific surface area of from 26 to 50 m$^2$/g by a BET method and preferably from 26 to 38 m$^2$/g by a BET method, and a coercive force (Hc$_1$) of from 500 to 1,000 Oe and preferably from 700 to 1,000 Oe, and that the upper magnetic layer has ferromagnetic particles having a specific surface area by a BET method of from 30 to 60 m$^2$/g and preferably from 30 to 38 m$^2$/g, and a coercive force (Hc$_2$) of from 600 to 1,200 Oe and preferably from 750 to 900 Oe.

Further, although the upper magnetic layer is an extremely thin layer having a thickness of from 0.1 to 1.0 μm and preferably from 0.1 to 0.7 μm, the surface thereof should be sufficiently smooth.

Also, a thickness of the under magnetic layer is generally from 1 to 5 μm and preferably from 3 to 4.5 μm.

As described above, characteristics at a high frequency bandwidth can be assured by making the coercive force (Hc$_2$) of the upper magnetic layer higher than that of the under magnetic layer, and characteristics at a low frequency bandwidth can be efficiently assured by making the upper magnetic layer extremely thin. As it was found that the ratio of the noise occurring due to granular particles in the under magnetic layer to outputs was increased by making the upper magnetic layer thinner, it is preferred that the under magnetic layer uses ferromagnetic particles having a specific surface area of comparatively large value as described above, thereby decreasing noise level. In other words, it is desired that the difference of a specific surface area measured by a BET method of ferromagnetic particles contained in the under magnetic layer and that contained in the upper magnetic layer is 10 m$^2$/g or less.

The following method for preparing magnetic layers of the present invention is necessary to obtain the upper magnetic layer having an extremely smooth surface, although it is an extremely thin layer having a thickness of from 0.1 to 1.0 μm (preferably from 0.1 to 0.7 μm), which is the most characteristic feature of the present invention.

The method for preparing the above-described extremely thin upper magnetic layer comprises coating a coating composition for an under magnetic layer containing predetermined ferromagnetic particles on a surface of a running nonmagnetic support, and while the coated under layer is wet, successively coating thereon a coating composition for an upper magnetic layer containing predetermined ferromagnetic particles so that the dry thickness of the upper magnetic layer is from 0.1 to 1.0 μm and preferably from 0.1 to 0.7 μm. This coating method for the upper and under magnetic layers is called "wet-on-wet coating method".

In the magnetic recording medium of the present invention, as the upper magnetic layer has sufficient running durability, it is preferred that the under magnetic layer contains lesser amounts of abrasive agents than amounts contained in the upper magnetic layer, and particularly contains no abrasive agents, in order to provide excellent electromagnetic characteristics.

The binder resins for use in each magnetic layer of the present invention are not particularly limited. Examples of the binder resins include vinyl chloride type copolymer (e.g., vinyl chloride, vinyl acetate copolymer; vinyl chloride, vinyl acetate and vinyl alcohol copolymer; vinyl chloride, vinyl acetate and acrylic acid copolymer; vinyl chloride and vinylidene chloride copolymer; vinyl chloride and acrylonitrile copolymer; ethylene and vinyl acetate copolymer); cellulose derivatives such as nitrocellulose resin; acrylic resins; polyvinyl acetal resins; polyvinyl butyral resins; epoxy resins; phenoxy resins; and polyurethane resins (e.g., polyester type polyurethane resins, polyether type polyurethane resins, polycarbonate polyurethane resins). Also, a polar group such as a hydroxyl group, a carboxyl group, an epoxy group, a metal sulfonate group, a phosphoric acid group or a phosphate group may be contained in the above resins.

These resins may be used alone or in combination.

In case a hardening agent is used, polyisocyanate compounds are generally used. The polyisocyanate compounds are selected from those that are generally used as components of a hardening agent such as polyurethane type resins. Examples of polyisocyanate compounds include a reaction product of tolylene diisocyanate and 1 mol of trimethylolpropane (e.g., "Desmodule L-75" made by Bayer Co., Ltd., a reaction product of 3 mols of diisocyanate such as xylylene diisocyanate or hexamethylene diisocyanate and 1 mol of trimethylolpropane, buiret adduct product of 3 mols of hexamethylene diisocyanate, an isocyanurate compound of 5 mols of tolylene diisocyanate, an isocyanurate adduct of 3 mols of tolylene diisocyanate and 2 mols of hexamethylene diisocyanate, and polymers of isophorone diisocyanate and diphenylmethane diisocyanate.

In case a hardening treatment is done using electron beam irradiation, a compound having a reactive double bond (e.g., urethane acrylate) can be used.

The total weight amount of resin components and a hardening agent is generally from 5 to 40 parts by weight and preferably from 10 to 20 parts by weight per 100 parts by weight of ferromagnetic particles.

The total weight amount of resin components which are used as binders for the magnetic layer is generally from 5 to 50 parts by weight and preferably from 15 to 30 parts by weight per 100 parts by weight of the ferromagnetic particles in the magnetic layer.

The examples of ferromagnetic particles for the upper and under layers used in the present invention include ferromagnetic particles of metal oxides such as $\gamma$-$Fe_2O_3$, and ferromagnetic particles of a different metal and metal oxide type such as cobalt or another component containing $\gamma$-$Fe_2O_3$.

In order to obtain running durability in the present invention, it is preferred that abrasive agents having Mohs, hardness of 6 or more be included particularly in the upper magnetic layer. The abrasive agents having Mohs, hardness of 6 or more include $\alpha$-$Al_2O_3$ (Mohs' hardness: 9), $TiO_2$ (Mohs' hardness: 6.5), $SiO_2$ (Mohs' hardness: 7), $SnO_2$ (Mohs' hardness: 6.5), $Cr_2O_3$ (Mohs' hardness: 9) and $SiC_2$ (Mohs' hardness: 9). $\alpha$-$Al_2O_3$ and Cr are particularly preferred. An amount of the abrasive agents which are contained in the upper magnetic layer is generally from 0.1 to 20 parts by weight and preferably from 1 to 10 parts by weight, per 100 parts by weight of the ferromagnetic particles in the upper magnetic layer.

A magnetic coating composition is prepared by mixing, kneading and dispersing the above-described resins, hardening agents and ferromagnetic particles with solvents that are generally used for preparing a magnetic coating composition (e.g., methyl ethyl ketone, dioxane, cyclohexanone, ethyl acetate). The mixing, kneading and dispersing is conducted in the conventional manner.

The additives such as antistatic agents (e.g., carbon black), lubricating agents (e.g., fatty acid, fatty acid ester, silicon oil) or dispersing agents that are generally used, and fillers may be contained in the magnetic coating composition.

The method for preparing a magnetic recording medium of the present invention is illustrated hereinafter.

The magnetic coating composition thus-prepared as described above is coated on a nonmagnetic support in the following manner. That is, an under coating composition for an under magnetic layer is prepared by mixing, kneading and dispersing the resins, predetermined ferromagnetic particles and, if desired, hardening agents with solvents. And thereafter, an upper coating composition for an upper magnetic layer is prepared in the same manner as above.

An inventive feature of the present invention's method for preparing a mangetic recording medium resides in that an under coating composition for an under magnetic layer is coated on a surface of running nonmagnetic support, and while the under layer is wet, successively an upper coating composition for an upper magnetic layer is coated thereon so that the upper magnetic layer has a dry thickness of from 0.1 to 1.0 $\mu$m and preferably from 0.1 to 0.7 $\mu$m.

Two layers are successively provided, for example, when a reverse roller is used as a coating device, under the conditionthat two reverse rollers are successively installed so that the running nonmagnetic support is placed therebetween, or under the condition that two reverse rollers are installed in such a certain distance that an upper magnetic layer can be coated while an under magnetic layer is wet (i.e., the state when the under layer is still containing solvents and exhibiting adhesiveness).

As described above, in the present invention it is necessary that the upper magnetic layer has a thickness of from 0.1 to 1.0 $\mu$m. In case two magnetic layers are provided, generally, a coating composition for an under magnetic layer is coated, dried, and therafter, a coating composition for an upper magnetic layer is coated, as disclosed in JP-A-58-17539, JP-A-58-56228 and JP-A-58-56229. However, in case an upper magnetic layer is provided after an under magnetic layer is dried, it is difficult and nearly impossible to obtain an extremely thin an duniform layer having athickness of from 0.1 to 1.0 $\mu$m. In order to obtain an extremely thin and uniform layer having athickness of from 0.1 to 1.0 $\mu$m (preferably from 0.1 to 0.7 $\mu$m) of the present invention, it is necessary that an under magnetic layer is provided, and while the under layer is wet, a coating composition for an upper magnetic layer is successively coated thereon.

The thus-obtained upper magnetic layer prepared by the above method is an extremely thin and uniform layer having a thickness of from 0.1 to 1.0 $\mu$m, and moreover, the surface thereof is extremely smooth. For the above reason, a magnetic recording medium for a video tape recorder having an improved C/N at a wide bandwidth can be prepared per the present invention.

The coating composition is coated so that the total thickness of the thus-obtained magnetic layer (the combined thickness of the under and upper magnetic layers) is generally from 0.5 to 10 $\mu$m and preferably from 1 $\mu$m to 5 $\mu$m.

A backing layer may be provided on the surface of the nonmagnetic support having coated thereon no magnetic coating composition as described in U.S. Pat. No. 4,135,016. Generally, a backing layer is a layer coated with a coating composition for forming a backing layer containing granular components such as abrasive agents or antistatic agents and binders which are dispersed in an organic solvent on the surface of a nonmagnetic support having coated thereon no magnetic coating composition.

An adhesive layer may be provided on the surfaces of a nonmagnetic support to be coated with a magnetic coating composition and a coating composition for a backing layer.

The layer coated with a magnetic coating composition is generally subjected to magnetic orientation to orientate ferromagnetic particles contained in the magnetic layer, and then that layer is dried.

After it is dried, the layer is subjected to surface smoothing treatment. The surface smoothing treatment is generally conducted, for example, by supercalender roll. The holes formed by the removal of solvents at drying can be removed by surface smoothing treatment, and thereby the packing density of ferromagnetic particles in the magnetic layer increases, and thus, a magnetic recording medium having excellent electromagnetic characteristics can be obtained.

The coating method, magnetic orientation, surface smoothing treatment, etc., which are used to obtain the magnetic recording medium comprising plural magnetic layers of the present invention are described in JP-B-40-23625, JP-B-39-28368, JP-B-41-13181, and JP-B-56-26890 (the term "JP-B" as used herein refers to an "examined Japanese patent publication"), U.S. Pat. No. 3,473,960, and Yuji Harasaki, *Coating Engineering* Asakura Shoten, pp. 253–277 (Mar. 20, 1971).

The thus-hardened laminated layer is slit to a desired shape.

Slitting can be done using a general device such as a slitter in a conventional manner.

The magnetic recording medium having two (upper and under) magnetic layers of the present invention has been illustrated, and so long as two layers having the above-described properties are secured, the magnetic recording medium may have three or more layers.

The present invention will be illustrated in more detail by the following examples and comparative examples, but the present invention is not to be construed as being limited thereto. In these examples and comparative examples, all parts are by weight.

PREPARATION OF A MAGNETIC COATING COMPOSITION

Magnetic Coating Composition 1

The following composition was put in a ball mill and mixed, kneaded and dispersed for 48 hours, 6 parts of polyisocyanate ("Collonate L", made by Nippon Polyurethane Co., Ltd.) was added thereto, and mixed, kneaded and dispersed for 1 hour, and the composition was filtrated using a filter having an average pore diameter of 1 μm to prepare a magnetic coating composition.

COMPOSITION FOR A MAGNETIC COATING COMPOSITION

| | |
|---|---|
| Co-containing $\gamma$-Fe$_2$O$_3$ (Hc: 1,300 Oe, saturation magnetization $\sigma$s: 74 emu/g, average particle size: 0.15 m, $S_{BET}$ specific surface area: 46 m$^2$/g) | 100 parts |
| Vinyl chloride and vinyl acetate copolymer (molar ratio: 87/13) (carboxylic group: 5 × 10$^{-4}$ mol/g, degree of polymerization: 400) | 12 parts |
| Polyester polyurethane resin ("Crisvon 7209", made by Dainippon Ink and Chemicals, Inc.) | 6 parts |
| Stearic acid | 3 parts |
| Butyl stearate | 1 part |
| $\alpha$-Al$_2$O$_3$ (average particle diameter: 0.2 μm) | 3 parts |
| Butyl acetate | 300 parts |

As described above, Magnetic Coating Composition 1 was prepared.

Magnetic Coating Compositions 2 to 22 were prepared in the same manner as above except that values for the coercive force (Hc) and/or $S_{BET}$ specific surface area of Co-containing $\gamma$-Fe-hd 2O$_3$ in the coating composition were changed. Magnetic Coating Composition 22 did not contain $\alpha$-Al$_2$O$_3$. The specific values of coercive force (Hc) and/or $S_{BET}$ specific surface area of Co-containing $\gamma$-Fe$_2$O$_3$ as used in Magnetic Coating Compositions 1 through 22 are shown in Table 1.

TABLE 1

| Magnetic Coating Composition No. | Hc (Oe) | $S_{BET}$ (m$^2$/g) |
|---|---|---|
| 1 | 1,300 | 46 |
| 2 | 1,200 | 46 |
| 3 | 1,100 | 38 |
| 4 | 950 | 25 |
| 5 | 950 | 30 |
| 6 | 950 | 40 |
| 7 | 950 | 46 |
| 8 | 950 | 55 |
| 9 | 950 | 60 |
| 10 | 900 | 38 |
| 11 | 700 | 25 |
| 12 | 700 | 28 |
| 13 | 700 | 30 |
| 14 | 700 | 38 |
| 15 | 700 | 40 |
| 16 | 700 | 60 |
| 17 | 600 | 38 |
| 18 | 600 | 46 |
| 19 | 500 | 38 |
| 20 | 500 | 46 |
| 21 | 300 | 38 |
| 22* | 700 | 38 |

*Magnetic Coating Composition 22 did not contain $\alpha$-Al$_2$O$_3$.

A video tape having a single layer type magnetic layer was prepared in Reference Examples 1 to 5.

REFERENCE EXAMPLE 1

Magnetic Coating Composition 1 prepared as described above was coated using a reverse roller on a surface of a polyethylene terephthalate support having a thickness of 15 μm, which was running at a rate of 60 m/min. The composition was coated in such a manner as to provide a dry thickness of the magnetic layer of 4.0 μm.

The nonmagnetic support thus coated with a magnetic coating composition was subjected to magnetic orientation using a 3,000 gauss magnet while the magnetic coating composition was undried. The coating was then dried to form a magnetic layer which was then treated with superalendering and slit to a ½ inch width to prepare a video tape.

REFERENCE EXAMPLE 2

A video tape was prepared in the same manner as in Reference Example 1 except that Magnetic Coating Composition 2 was used instead of Magnetic Coating Composition 1.

REFERENCE EXAMPLE 3

A video tape was prepared in the same manner as in Reference Example 1 except that Magnetic Coating Composition 7 was used instead of Magnetic Coating Composition 1.

REFERENCE EXAMPLE 4

A video tape was prepared in the same manner as in Reference Example 1 except that Magnetic Coating Composition 14 was used instead of Magnetic Coating Composition 1.

REFERENCE EXAMPLE 5

A video tape was prepared in the same manner as in Reference Example 1 except that Magnetic Coating Composition 17 was used instead of Magnetic Coating Composition 1.

Examples and comparative examples are shown below to demonstrate the coating method and the influences of the thickness of a magnetic layer when a plural structured magnetic layer is provided using Magnetic Coating Composition 14 as a magnetic coating composition for an under magnetic layer and using Magnetic Coating Composition 7 as a magnetic coating composition for an upper magnetic layer.

EXAMPLE 1

The thus-prepared Magnetic Coating Composition 14 (Hc: 700 Oe, $S_{BET}$: 38 m$^2$/g) for an under magnetic layer was coated using a reverse roll on a surface of a polyethylene terephthalate support having a thickness of 15 μm which was running at 60 m/min., in a dry thickness of 3.7 μm, and immediately thereafter (while the under magnetic layer was wet) the magnetic coating composition (Hc 950 Oe, $S_{BET}$ 46 m$^2$/g) for an upper magnetic layer was coated using a reverse roll in a dry thickness of 0.3 μm, and while the magnetic layers were wet, these layers were subjected to magnetic orientation using a 3,000 gauss magnet. The layers were dried and then treated with supercalendering and slit to a ½ inch width to prepare a video tape.

EXAMPLE 2

A video tape was prepared in the same manner as in Example 1 except that the under magnetic layer had a thickness of 3.5 μm instead of 3.7 μm and the upper magnetic layer had a thickness of 0.5 μm instead of 0.3 μm.

EXAMPLE 3

A video tape was prepared in the same manner as in Example 1 except that the under magnetic layer had a thickness of 3.3 μm instead of 3.7 μm and the upper magnetic layer had a thickness of 0.7 μm instead of 0.3 μm.

EXAMPLE 4

A video tape was prepared in the same manner as in Example 1 except that the under magnetic layer had a thickness of 3.0 μm instead of 3.7 μm and the upper magnetic layer had a thickness of 1.0 μm instead of 0.3 m.

COMPARATIVE EXAMPLE 1

A video tape was prepared in the same manner as in Example 1 except that the under magnetic layer had a thickness of 2.5 μm instead of 3.7 μm and the upper magnetic layer had a thickness of 1.5 μm instead of 0 3 μm.

COMPARATIVE EXAMPLE 2

The thus-prepared Magnetic Coating Composition 14 (Hc: 700 Oe, $S_{BET}$: 38 m$^2$/g) for an under magnetic layer was coated using a reverse roll on a polyethylene terephthalate support having a thickness of 15 μm which was running at 60 m/min., in a dry thickness of 3.7 μm, subjected to magnetic orientation using a 3,000 gauss magnet and then dried. Subsequently, Magnetic Coating Composition 7 (Hc: 950 Oe, $S_{BET}$: 46 m$^2$/g) for an upper magnetic layer was coated using a reverse roll in a dry thickness of 0.3 μm, and while the upper magnetic layer was wet, that upper layer was (1) subjected to magnetic orientation using a 3,000 gauss magnet, (2) dried, (3) subjected to supercalendering treatment, and (4) slit to a ½ inch width to prepare a video tape.

COMPARATIVE EXAMPLE 3

A video tape was prepared in the same manner as in Comparative Example 2 except that the under magnetic layer had a thickness of 3.5 μm instead of 3.7 μm and the upper magnetic layer had a thickness of 0.5 μm instead of 0.3 μm.

COMPARATIVE EXAMPLE 4

A video tape was prepared in the same manner as in Comparative Example 2 except that the under magnetic layer had a thickness of 3.3 μm instead of 3.7 μm and the upper magnetic layer had a thickness of 0.7 μm instead of 0.3 μm.

COMPARATIVE EXAMPLE 5

A video tape was prepared in the same manner as in Comparative Example 2 except that the under magnetic layer had a thickness of 3.0 μm instead of 3.7 μm and the upper magnetic layer had a thickness of 1.0 μm instead of 0.3 μm.

Regarding the video tapes obtained in reference examples, comparative examples and examples, the coating compositions and/or the thickness of the under and the upper magnetic layers and physical properties of each tape were evaluated in the following manner. The results of the evaluations are shown in Table 2 (Reference Examples 1 to 5), and Table 3 (Examples 1 to 4 and Comparative Examples 1 to 5).

Measurement

The video deck used in the measurement was the home S-VHS deck ("HRS 7000" made by Victor Co., Ltd.) which was modified so that C/N (modulation noise) of a single wave could be measured.

(1) Linear Audio Output

The linear audio output upon recording and reproducing a single sound at 1 KHz was measured and shown in terms of relative value when the output of Reference Example 3 was 0 dB.

(2) Hi-Fi Audio Output (i.e., FM audio output due to a specific audio system of a video tape recorder in which a frequency modulated signal (FM signal) is recorded and reproduced with a rotating head)

The Hi-Fi audio output upon recording and reproducing a single sound at 1 KHz was measured and shown in terms of relative value when the output of Reference Example 3 was 0 dB.

(3) C.S/N (color carrier/noise ratio) C.S/N was measured upon recording and reproducing single color signals using an S/N meter ("925R/1" made by Shibasoku Co., Ltd.) and is shown in terms of relative value when C.S/N of Reference Example 3 is 0 dB. "TG-7" made by Shibasoku Co., Ltd. was used to provide signal sources of single color signals.

(4) Y.S/N (signal to noise ratio of brilliance signal of video)

Y S/N was measure reproducing 50% white signals using S/N meter ("925R/1") and is shown in terms of a relative value when Y.S/N of Reference Example 3 is 0 dB. "TG-7" was used to provide signal sources of single color signals.

(5) 6 MHz.C/N

A single wave at 6 MHz in an outer oscillator ("3325A" made by HP Co., Ltd.) was input into VTR (video tape recorder), and recording and reproducing was done at an optimum recording level. C/N is shown in terms of a relative value when C/N of Reference Example 3 is 0 dB.

Regarding C/N, the reproduced output at 6 MHz was read as the carrier output and the signal level at 4 MHz, with 2 MHz far away from the carrier at 6 MHz, was read as the noise level. Then, the ratio of carrier C of the carrier output to noise N of the noise level is shown in terms of dB.

TABLE 2

| Reference Example No. | Coating Composition | Layer Thickness (μm) | Audio Linear (dB) | Hi-Fi (dB) | C.S/N (dB) | Y.S/N (dB) | 6 MHz.C/N (dB) |
|---|---|---|---|---|---|---|---|
| 1 | 1 | 4.0 | −3.0 | −1.0 | −2.0 | −0.5 | −0.5 |
| 2 | 2 | 4.0 | −2.0 | −0.5 | −1.0 | 0 | 0 |
| 3 | 7 | 4.0 | 0 | 0 | 0 | 0 | 0 |
| 4 | 14 | 4.0 | +1.5 | +0.5 | +1.5 | −0.5 | −0.5 |
| 5 | 17 | 4.0 | +2.5 | +0.5 | +1.0 | −2.0 | −2.5 |

TABLE 3

| Example No. | Layer Thickness (under/upper) (μm) | Audio Linear (dB) | Hi-Fi (dB) | C.S/N (dB) | Y.S/N (dB) | 6 MHz.C/N (dB) |
|---|---|---|---|---|---|---|
| Example 1 | 3.7/0.3 | +1.0 | +0.5 | +1.0 | +0.5 | +0.7 |
| Example 2 | 3.5/0.5 | +1.5 | +0.5 | +1.5 | +0.5 | +0.7 |
| Example 3 | 3.3/0.7 | +2.0 | +0.5 | +1.0 | +0.5 | +0.7 |
| Example 4 | 3.0/1.0 | +2.0 | +0.5 | +0.8 | +0.5 | +0.7 |
| Comparative Example 1 | 2.5/1.5 | 0 | 0 | 0 | 0 | 0 |
| Comparative Example 2 | 3.7/0.3 | +0.9 | +0.3 | −1.8 | −0.5 | −1.8 |
| Comparative Example 3 | 3.5/0.5 | +1.4 | +0.3 | −1.0 | −0.5 | −1.5 |
| Comparative Example 4 | 3.3/0.7 | +1.9 | +0.3 | −1.5 | −0.5 | −1.5 |
| Comparative Example 5 | 3.0/1.0 | +1.9 | +0.4 | −0.3 | −0.3 | −0.7 |

In Table 3, the coating method used in Examples to 4 and Comparative Example 1 is a successive plural layer coating method of the present invention and the method used in Comparative Examples 2 to 5 is a conventional coating method wherein an upper layer is coated after an under layer is dried.

Examples 5 to 9 and Comparative Examples 6 to 8 are shown below, using Magnetic Coating Composition 7 as a coating composition for an upper magnetic layer, making the thickness of the upper and under magnetic layer constant, i.e., 0.5 μm and 3.5 μm, respectively, and using various coating compositions as compositions for an under magnetic layer having different coercive forces and specific surface areas to check the different influences thereof.

EXAMPLE 5

A video tape was prepared in the same manner as in Example 1 except that in Example 5 Magnetic Coating Composition 13 was used instead of Magnetic Coating Composition 14 as a composition for the under magnetic layer, the under magnetic layer had a thickness of 3.5 μm instead of 3.7 μm, and the upper magnetic layer had a thickness of 0.5 μm instead of 0.3 μm.

EXAMPLE 6

A video tape was prepared in the same manner as in Example 5 except that Magnetic Coating Composition 15 was used instead of Magnetic Coating Composition 13 as the composition for an under magnetic layer.

EXAMPLE 7

A video tape was prepared in the same manner as in Example 5 except that Magnetic Coating Composition 16 was used instead of Magnetic Coating Composition 13 as a coating composition for an under magnetic layer.

EXAMPLE 8

A video tape was prepared in the same manner as in Example 5 except that Magnetic Coating Composition 19 was used instead of Magnetic Coating Composition 13 as the coating composition for an under magnetic layer.

EXAMPLE 9

A video tape was prepared in the same manner as in Example 5 except that Magnetic Coating Composition 10 was used instead of Magnetic Coating Composition 13 as the coating composition for an under magnetic layer.

COMPARATIVE EXAMPLE 6

A video tape was prepared in the same manner as in Example 5 except that Magnetic Coating Composition 10 was used instead of Magnetic Coating Composition 13 as the coating composition for an under magnetic layer.

COMPARATIVE EXAMPLE 7

A video tape was prepared in the same manner as in Example 5 except that Magnetic Coating Composition 21 was used instead of Magnetic Coating Composition 13 as the coating composition for an under magnetic layer.

COMPARATIVE EXAMPLE 8

A video tape was prepared in the same manner as in Example 5 except that Magnetic Coating Composition 3 was used instead of Magnetic Coating Composition 13 as the coating composition for an under magnetic layer.

Regarding video tapes obtained in Examples 2, 5 to 9 and Comparative Examples 6 to 8, Table 4 shows the values for coercive force and specific surface area of the various coating compositions used for an under magnetic layer. Table 4 also shows the values for several physical properties of each tape measured in the above-described manner.

sitions for an upper magnetic layer having different coercive forces and different specific surface areas to see the different influences thereof.

In Example 15, the under magnetic layer did not contain $\alpha\text{-}Al_2O_3$ and in Comparative Example 13, the upper magnetic layer did not contain $\alpha\text{-}Al_2O_3$.

EXAMPLE 10

A video tape was prepared in the same manner as in Example 1 except that Magnetic Coating Composition 5 was used instead of Magnetic Coating Composition 7 as a composition for an upper magnetic layer, and the upper magnetic layer had a thickness of 0.5 μm instead of 0.3 μm.

EXAMPLE 11

A video tape was prepared in the same manner as in Example 10 except that Magnetic Coating Composition 8 was used instead of Magnetic Coating Composition 5 as a coating composition for an under magnetic layer.

EXAMPLE 12

A video tape was prepared in the same manner as in Example 10 except that Magnetic Coating Composition 9 was used instead of Magnetic Coating Composition 5 as a coating composition for an under magnetic layer.

EXAMPLE 13

A video tape was prepared in the same manner as in Example 10 except that Magnetic Coating Composition 2 was used instead of Magnetic Coating Composition 5 as a coating composition for an under magnetic layer.

EXAMPLE 14

A video tape was prepared in the same manner as in Example 10 except that Magnetic Coating Composition 6 was used instead of Magnetic Coating Composition 5 as a coating composition for an upper magnetic layer.

EXAMPLE 15

A video tape was prepared in the same manner as in Example 14 except that Magnetic Coating Composition 22 was used instead of Magnetic Coating Composition

TABLE 4

| Example No. | Coating Composition for Under Layer | | | Audio | | C.S/N (dB) | Y.S/N (dB) | 6 MHz.C/N (dB) |
|---|---|---|---|---|---|---|---|---|
| | No. | Hc (Oe) | $S_{BET}$ (m²/g) | Linear (dB) | Hi-Fi (dB) | | | |
| Example 5 | 13 | 850 | 30 | +1.5 | +0.5 | +1.0 | +0.3 | +0.5 |
| Example 2 | 14 | 850 | 38 | +1.5 | +0.5 | +1.5 | +0.5 | +0.7 |
| Example 6 | 15 | 850 | 40 | +1.5 | +0.5 | +1.5 | +0.5 | +0.7 |
| Example 7 | 16 | 850 | 60 | +1.5 | +0.3 | 0 | 0 | 0 |
| Example 8 | 19 | 500 | 38 | +0.5 | 0 | +0.5 | +0.5 | +0.5 |
| Example 9 | 10 | 900 | 38 | +0.5 | +0.5 | +0.5 | +0.5 | +0.7 |
| Comparative Example 6 | 11 | 850 | 25 | +1.5 | +0.5 | −1.0 | −0.2 | −0.4 |
| Comparative Example 7 | 21 | 300 | 38 | −1.0 | −1.0 | −1.5 | 0 | 0 |
| Comparative Example 8 | 3 | 1100 | 38 | −2.5 | 0 | −1.0 | +0.5 | +0.7 |

(Values for Example 2 are indicated for reference.)

Examples 10 to 15 and Comparative Examples 9 to 12 are shown below, using Magnetic Coating Composition 14 as the composition for an under magnetic layer, making the thickness of the upper and under magnetic layers constant, i.e., 0.5 82 m and 3.5 μm, respectively, similar to the above-described Examples 5 to 9, and using various different coating compositions as compo- 14 as a coating composition for an upper magnetic layer.

COMPARATIVE EXAMPLE 9

A video tape was prepared in the same manner as in Example 10 except that Magnetic Coating Composition 4 was used instead of Magnetic Coating Composition 5 as a coating composition for an upper magnetic layer.

COMPARATIVE EXAMPLE 10

A video tape was prepared in the same manner as in Example 10 except that Magnetic Coating Composition 20 was used instead of Magnetic Coating Composition 5 as a coating composition for an upper magnetic layer.

COMPARATIVE EXAMPLE 11

A video tape was prepared in the same manner as in Example 10 except that Magnetic Coating Composition 1 was used instead of Magnetic Coating Composition 5 as a coating composition for an upper magnetic layer.

COMPARATIVE EXAMPLE 12

A video tape was prepared in the same manner as in Example 10 except that Magnetic Coating Composition 22 was used instead of Magnetic Coating Composition 5 as a coating composition for an upper magnetic layer.

Regarding video tapes obtained in examples and comparative examples, Table 5 shows the values for coercive force and specific surface area of the various coating compositions used for an upper magnetic layer. Table 5 also shows the values for several physical properties of each tape measured in the above-described manner.

TABLE 5

| Example No. | Upper Layer Composition No. | Hc (Oe) | $S_{BET}$ (m²/g) | Audio Linear (dB) | Audio Hi-Fi (dB) | C.S/N (dB) | Y.S/N (dB) | 6 MHz.C/N (dB) |
|---|---|---|---|---|---|---|---|---|
| Example 10 | 5 | 950 | 30 | +1.5 | +0.3 | 0 | +0.2 | +0.4 |
| Example 2 | 7 | 950 | 46 | +1.5 | +0.5 | +1.5 | +0.5 | +0.7 |
| Example 11 | 8 | 950 | 55 | +1.5 | +0.5 | +1.5 | +0.5 | +0.7 |
| Example 12 | 9 | 950 | 60 | +1.5 | +0.5 | +1.5 | −0.5 | −0.5 |
| Example 13 | 2 | 1200 | 46 | 0 | 0 | 0 | +0.3 | +0.5 |
| Example 14 | 6 | 950 | 40 | +1.5 | +0.5 | +1.3 | +0.4 | +0.6 |
| Example 15 | 6 | 950 | 40 | +2.0 | +0.5 | +1.8 | +0.6 | +0.8 |
| Comparative Example 9 | 4 | 950 | 25 | +1.5 | 0 | −1.0 | −0.5 | −0.5 |
| Comparative Example 10 | 20 | 500 | 46 | −1.0 | −2.0 | −2.0 | −2.0 | −3.0 |
| Comparative Example 11 | 1 | 1300 | 46 | −1.0 | −0.5 | −1.0 | 0 | 0 |
| Comparative Example 12 | 22 | 850 | 38 | +1.0 | +0.5 | +0.5 | −2.0 | −2.5 |

(Values for Example 2 are indicated as reference.)

The magnetic layers provided by a method of successively coating plural layers of the present invention exhibit excellent electromagnetic characteristics such as improved S/N and C/N. (See, e.g., Table 3). As the thickness of the upper magnetic layer decreases more and more from 1.0 μm to 0.1 μm, the electromagneitc characteristics degrade more and more. This degradation is due to the increase of tape modulation noise occurring because of surface roughness of a tape, as in clear from the state of degradation of 6 MHz.C/N.

Table 4 shows the influence of coercive force and specific surface area of the under magnetic layer upon electromagnetic characteristics. It is clear that electromagnetic characteristics deteriorate in cases when values of both coercive force and specific surface area are outside of the predetermined range as defined in the present invention.

Table 5 shows the influence of coercive force and specific surface area of the upper magnetic layer upon electromagnetic characteristics. It is clear that electromagnetic characteristics deteriorate in cases when values of both coercive force and specific surface area are outside of their respective ranges as defined in the present invention. As is clear from Example 15, electromagnetic characteristics are improved when the under magnetic layer does not contain $\alpha$-$Al_2O_3$ as an abrasive agent. Also, as is clear from Comparative Example 12, electromagnetic characteristics deteriorate when the upper magnetic layer does not containing an abrasive agent.

While the invention has been described in detail and with reference to specific embodiments thereof, it will be apparent to one skilled in the art that various changes and modifications can be made therein without departing from the spirit and scope thereof.

What is claimed is:

1. A magnetic recording medium for a video tape recorder comprising a nonmagnetic support having thereon a magnetic medium, wherein said magnetic medium consists essentially of a thin uniform upper magnetic layer and an under magnetic layer, said under magnetic layer containing ferromagnetic particles of metal oxide, said thin uniform upper magnetic layer being thinner than said under magnetic layer, said upper magnetic layer containing ferromagnetic particles of metal oxide, wherein said under magnetic layer contains the ferromagnetic particles having a specific surface area by a BET method of from 26 to 50 m²/g and a coercive force ($Hc_1$) of from 500 to 1,000 Oe; said upper magnetic layer contains the ferromagnetic particles having a specific surface area by a BET method of from 30 to 60 m²/g and a coercive force ($Hc_2$) of from 600 to 1,200 Oe; the dry thickness of the upper magnetic layer is from 0.1 to 1.0 μm; and the coercive force ($Hc_2$) of the ferromagnetic particles for the upper magnetic layer is higher than the coercive force ($Hc_1$) of the ferromagnetic particles for the under magnetic layer.

2. A magnetic recording medium for a video tape recorder as in claim 1, wherein the upper magnetic layer has a thickness of from 0.1 to 0.7 μm.

3. A magnetic recording medium for a video tape recorder as in claim 1, wherein the difference of a specific surface area by a BET method of ferromagnetic particles contained in the under magnetic layer and those contained in the upper magnetic layer is 10 m²/g or less.

4. A magnetic recording medium for a video tape recorder as in claim 1, wherein the under magnetic layer contains lesser amounts of abrasive agents than amounts contained in the upper magnetic layer.

5. A magnetic recording medium for a video tape recorder as in claim 1, wherein the under magnetic layer does not contain abrasive agents at all.

6. A magnetic recording medium for a video tape recorder as in claim 1, wherein the upper magnetic layer further contains abrasive agents having Mohs' hardness of 6 or more.

7. A magnetic recording medium for a video tape recorder as in claim 6, wherein the abrasive agents having Mohs' hardness of 6 or more are selected from the group consisting of $\alpha$-$Al_2O_3$, $TiO_2$, $SiO_2$, $SnO_2$, $Cr_2O_3$ and $SiC_2$.

8. A magnetic recording medium for a video tape recorder as in claim 1, wherein the thickness of the under magnetic layer is from 1.0 to 5.0 $\mu$m.

9. A method for preparing a magnetic recording medium for a video tape recorder which comprises coating on a surface of a running nonmagnetic support an under coating composition for an under magnetic layer, wherein said under coating composition contains ferromagnetic particles of metal oxide having a specific surface area of from 26 to 50 $m^2/g$ and a coercive force ($Hc_1$) of from 500 to 1,000 Oe; and while the under coated layer is wet, coating successively thereon an upper coating composition for an upper magnetic layer, wherein said upper coating composition contains ferromagnetic particles of metal oxide having a specific surface area by a BET method of from 30 to 60 $m^2/g$ and a coercive force ($Hc_2$) of from 600 to 1,200 Oe, which is higher than the coercive force ($Hc_1$) of the under magnetic layer so that the dry thickness of the upper magnetic layer is from 0.1 to 1 0 $\mu$m.

10. A method for preparing a magnetic recording medium for a video tape recorder as in claim 9, wherein the difference of a specific surface area by a BET method for ferromagnetic particles contained in the under magnetic layer and those contained in the upper magnetic layer is 10 $m^2/g$ or lower.

11. A method for preparing a magnetic recording medium for a video tape recorder as in claim 9, wherein the under magnetic layer does not contain any abrasive agents at all.

12. A method for preparing a magnetic recording medium for a video tape recorder as in claim 9, wherein the upper magnetic layer further contains abrasive agents having Mohs' hardness of 6 or more.

13. A magnetic recording medium for a video tape recorder as in claim 9 wherein the thickness of the under magnetic layer is from 1.0 to 5.0 $\mu$m.

14. A magnetic recording medium for a video tape recorder comprising a nonmagnetic support having thereon in the following order an under magnetic layer containing ferromagnetic particles of metal oxide and an upper magnetic layer containing ferromagnetic particles of metal oxide, wherein there is not any mixed area between the upper magnetic layer and the under magnetic layer, and wherein said under magnetic layer contains the ferromagnetic particles having a specific surface area by a BET method of from 26 to 50 $m^2/g$ and a coercive force ($Hc_2$) of from 500 to 1,000 Oe; said upper magnetic layer contains the ferromagnetic particles having a specific surface area by a BET method of frm 30 to 60 $m^2/g$ and a coercive force ($Hc_2$) of from 600 to 1,200 Oe; the dry thickness of the upper magnetic layer is from 0.1 to 1.0 $\mu$m; and the coercive force ($Hc_2$) of the ferromagnetic particles for the upper magnetic layer is higher than the coercive force ($Hc_1$) of the ferromagnetic particles for the under magnetic layer.

* * * * *